United States Patent
Gordon, II et al.

(10) Patent No.: US 10,008,729 B2
(45) Date of Patent: Jun. 26, 2018

(54) HIGH PERFORMANCE FLOW BATTERY

(71) Applicant: Applied Materials, Inc., Santa Clara, CA (US)

(72) Inventors: Joseph Grover Gordon, II, San Jose, CA (US); Alan J. Gotcher, Incline Village, NV (US); Godfrey Sikha, Santa Clara, CA (US); Gregory J. Wilson, Kalispell, MT (US)

(73) Assignee: Applied Materials, Inc., Santa Clara, CA (US)

( * ) Notice: Subject to any disclaimer, the term of this patent is extended or adjusted under 35 U.S.C. 154(b) by 460 days.

(21) Appl. No.: 14/470,779

(22) Filed: Aug. 27, 2014

(65) Prior Publication Data

US 2014/0363707 A1 Dec. 11, 2014

Related U.S. Application Data

(63) Continuation of application No. 13/076,337, filed on Mar. 30, 2011.
(Continued)

(51) Int. Cl.
*H01M 8/04* (2016.01)
*H01M 8/20* (2006.01)
(Continued)

(52) U.S. Cl.
CPC ........ *H01M 8/04186* (2013.01); *H01M 2/38* (2013.01); *H01M 8/188* (2013.01); *H01M 8/20* (2013.01)

(58) Field of Classification Search
CPC .......... H01M 2/38; H01M 8/20; H01M 8/188; H01M 8/04186
See application file for complete search history.

(56) References Cited

U.S. PATENT DOCUMENTS 3,907,603 A 9/1975 Kocherginsky et al.
3,923,550 A 12/1975 von Krusenstierna
(Continued)

FOREIGN PATENT DOCUMENTS

CN 101677136 A 3/2010
WO WO 9939397 A1 * 8/1999 .............. H01M 2/40
(Continued)

OTHER PUBLICATIONS

Office Action for Chinese Application No. 201180016873.6 dated Jun. 3, 2015.
(Continued)

*Primary Examiner* — Stephan Essex
(74) *Attorney, Agent, or Firm* — Patterson + Sheridan LLP

(57) ABSTRACT

High performance flow batteries, based on alkaline zinc/ferro-ferricyanide rechargeable ("ZnFe") and similar flow batteries, may include one or more of the following improvements. First, the battery design has a cell stack comprising a low resistance positive electrode in at least one positive half cell and a low resistance negative electrode in at least one negative half cell, where the positive electrode and negative electrode resistances are selected for uniform high current density across a region of the cell stack. Second, a flow of electrolyte, such as zinc species in the ZnFe battery, with a high level of mixing through at least one negative half cell in a Zn deposition region proximate a deposition surface where the electrolyte close to the deposition surface has sufficiently high zinc concentration for deposition rates on the deposition surface that sustain the uniform high current density.

20 Claims, 11 Drawing Sheets

Related U.S. Application Data

(60) Provisional application No. 61/322,780, filed on Apr. 9, 2010, provisional application No. 61/319,248, filed on Mar. 30, 2010.

(51) Int. Cl.
    *H01M 8/18* (2006.01)
    *H01M 8/04186* (2016.01)
    *H01M 2/38* (2006.01)

(56) References Cited

U.S. PATENT DOCUMENTS

| | | | |
|---|---|---|---|
| 4,039,729 | A | 8/1977 | Benczur-Urmossy et al. |
| 4,180,623 | A | 12/1979 | Adams |
| 4,730,153 | A | 3/1988 | Breting et al. |
| 5,439,757 | A | 8/1995 | Zito |
| 2011/0200893 | A1* | 8/2011 | Friesen ............... H01M 12/08 429/404 |

FOREIGN PATENT DOCUMENTS

| | | |
|---|---|---|
| WO | 2008133978 A1 | 11/2008 |
| WO | 2011126908 A2 | 10/2011 |

OTHER PUBLICATIONS

International Search Report and Written Opinion dated Oct. 24, 2011 for PCT/US2011/030613.

Wu et al, "Mass Transfer and Current Distribution in a Zinc/Redox-Battery Flow Cell," Indian Journal of Technology, vol. 24, Jul. 1986, pp. 372-380.

Dirkse, et al, "The Behavior of the Zinc Electrode in Alkaline Solutions," J. Electrochem. Soc., vol. 128 (No. 7), Jul. 1981, pp. 1412-1416.

Dirkse, et al, "Aqueous Potassium Hydroxide as Electrolyte for the Zinc Electrode," J. Electrochem. Soc., vol. 134 (No. 1), Jan. 1987, pp. 1-13.

Liu, et al, "Conductivity of KOH Electrolyte Supersaturated with Zincate," J. Electrochem. Soc., vol. 128 (No. 10), Oct. 1981, pp. 2045-2052.

Debiemme-Couvy et al, "Supersaturated Zincate Solutions: A Study for the Decomposition Kinetics," vol. 138 (No. 9), Sep. 1991, pp. 2538, 2542.

Naybour, "The Effect of Electrolyte Flow on the Morphology of Zinc Electrododeposited from Aqueous Alkaline Solution Containing Zincate Ions," J. Electrochem. Soc., Apr. 1969, pp. 520-525.

Adams, et al, "Rechargeable Alkaline Zinc/Ferricyanide Battery, Final Report for the period Sep. 29, 1978-Sep. 28, 1979," prepared for U.S. DOE, Div. of Energy Storage Systems, Lockheed Missiles & Space Company, Inc.; LMSC-D678426.

Adams, et al, "Rechargeable Alkaline Zinc/Ferricyanide Battery, Final Report for the period Apr. 1, 1980-Jun. 1, 1981," prepared for U.S. DOE, Lawrence Berkeley Laboratories, Lockheed Missiles & Space Company, Inc.

Hollandsworth, et al. "Zinc/Ferricyanide Battery Development Phase IV, Final Report for the period May 9, 1983-Feb. 15, 1985," prepared for U.S. DOE, Sandia National Laboratories, Lockheed Missiles & Space Company, Inc.

Hollandsworth, et al. "Zinc Redox Battery Development Phase V, Final Report for the period Nov. 1, 1985-Jan. 31, 1987," prepared for U.S. DOE, Sandia National Laboraties, Lockheed Missiles & Space Company, Inc.

Office Action for U.S. Appl. No. 13/076,337 dated Oct. 14, 2013.

Final Office Action for U.S. Appl. No. 13/076,337 dated Mar. 27, 2014.

Office Action for Chinese Application No. 201180016873.6 dated Aug. 5, 2014.

Adams, et al, "Rechargeable Aklaline Zinc/Ferricyanide Battery Phase III, Final Report for the period Oct. 26, 1981-Sep. 18, 1982," prepared for U.S. DOE, Sandia National Laboratories, Lockheed Missiles & Space Company, Inc.

Third Office Action for Chinese Application No. 201180016873.6 dated Nov. 4, 2015.

\* cited by examiner

Schematic of zinc/redox flow battery

PRIOR ART

HIGH PERFORMANCE FLOW BATTERY

CROSS-REFERENCE TO RELATED APPLICATIONS

This application is a continuation application of U.S. patent application Ser. No. 13/076,337, filed on Mar. 30, 2011 and now published as U.S. No. 2011/0244277, which claims benefit of U.S. Provisional Patent Application Ser. Nos. 61/319,248 filed Mar. 30, 2010 and No. 61/322,780 filed Apr. 9, 2010, all of which are incorporated by reference in their entirety herein.

FIELD OF THE INVENTION

This invention relates to high performance electrochemical cells and batteries, and more particularly to flow batteries.

BACKGROUND OF THE INVENTION

The "greening" of the energy economy, increasing demand and use of renewable energy sources such as wind and solar, and the expected proliferation for example of plug-in hybrid vehicles and all electric vehicles, increasingly strain the electricity distribution grid. High capacity electrical energy storage technologies such as pumped hydroelectric can play an important role in grid load balancing, time shifting renewable energy sources from time of generation to peak time of use, however, geography and cost limit their use, particularly on a local level.

Existing high capacity battery technologies, for example flow batteries, are too expensive for widespread adoption because the effective cost of the resulting energy and/or power delivered is well above market prices. There exists therefore a substantially unmet need for a low-cost, high-capacity, efficient and high performance battery technology.

SUMMARY OF THE INVENTION

Embodiments of the present invention provide high performance flow battery apparatus and methods for enhancing, charging, operating and using flow batteries. High current density charging rates and discharging rates in the range of approximately 70 to 400 mA/cm$^2$, and more particularly in the range of 100 to 250 mA/cm$^2$, are provided by various embodiments of the present invention.

Embodiments of the high performance, alkaline zinc/ferro-ferricyanide rechargeable ("ZnFe") flow batteries of the present invention are based on a number of improvements over the prior art. These embodiments are also applicable to other flow batteries that incorporate the plating of a metal to store energy (such as: ZnHBr; ZnBr; CeZn; and ZnCl).

First, the battery design has a cell stack comprising a low resistance positive electrode in at least one positive half cell and a low resistance negative electrode in at least one negative half cell, where the positive electrode and negative electrode resistances are selected for uniform high current density across a region of the cell stack—that is with a resistance across the electrodes sufficiently low to ensure small voltage variations across the electrode and hence uniform current flow out of the electrode and across the cell stack.

Second, a flow of electrolyte (for example, zinc species in the ZnFe battery) with a high level of mixing (also referred to herein as a "high rate of mixing" and "high mixing") through at least one negative half cell in a Zn deposition region proximate a deposition surface where the electrolyte close to the deposition surface has sufficiently high zinc concentration for deposition rates on the deposition surface that sustain the uniform high current density. The electrolyte flow and mixing of the flow in the negative half cell are engineered to provide a mass transfer coefficient sufficient to support the high current density and to provide substantially uniform deposition of, for example zinc, over the deposition surface of a cell. Furthermore, some embodiments have been flow engineered to provide zinc deposition at less than a limiting current, where the deposited zinc has a dense, adherent, non-dendritic morphology.

Third, the zinc electrolyte has a high concentration and in some embodiments has a concentration greater than the equilibrium saturation concentration—the zinc electrolyte is super-saturated with Zn ions. Different embodiments of the present invention combine one or more of these improvements.

Electrolyte flow with high mixing through the cell may be due to high fluid velocity in a parallel plate channel. However, the mixing in the flow may be induced by structures such as: conductive and non-conductive meshes; screens; ribbons; foam structures; arrays of cones, cylinders, or pyramids; and other arrangements of wires or tubes used solely or in combination with a planar electrode surface. Use of such structures may allow for high mixing of the electrolyte with laminar flow or with turbulent flow at high or low fluid velocity. Furthermore, structures for calming the turbulent flow may be included in the electrolyte fluid circuit immediately after the cell.

According to embodiments of the present invention, methods for operating a flow battery may include flowing electrolyte with high mixing in a laminar flow regime, or turbulent flow regime, through at least one negative half cell in a Zn deposition region proximate a deposition surface. Furthermore, some embodiments include depositing Zn with a dense, adherent, non-dendritic morphology. The high mixing flow may be utilized during charging and/or discharging of battery cells.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION

Embodiments of the present invention will now be described in detail with reference to the drawings, which are provided as illustrative examples of some embodiments of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

Embodiments of the present invention provide high performance flow battery apparatus and methods for enhancing, charging, operating and using flow batteries.

Figure 1:
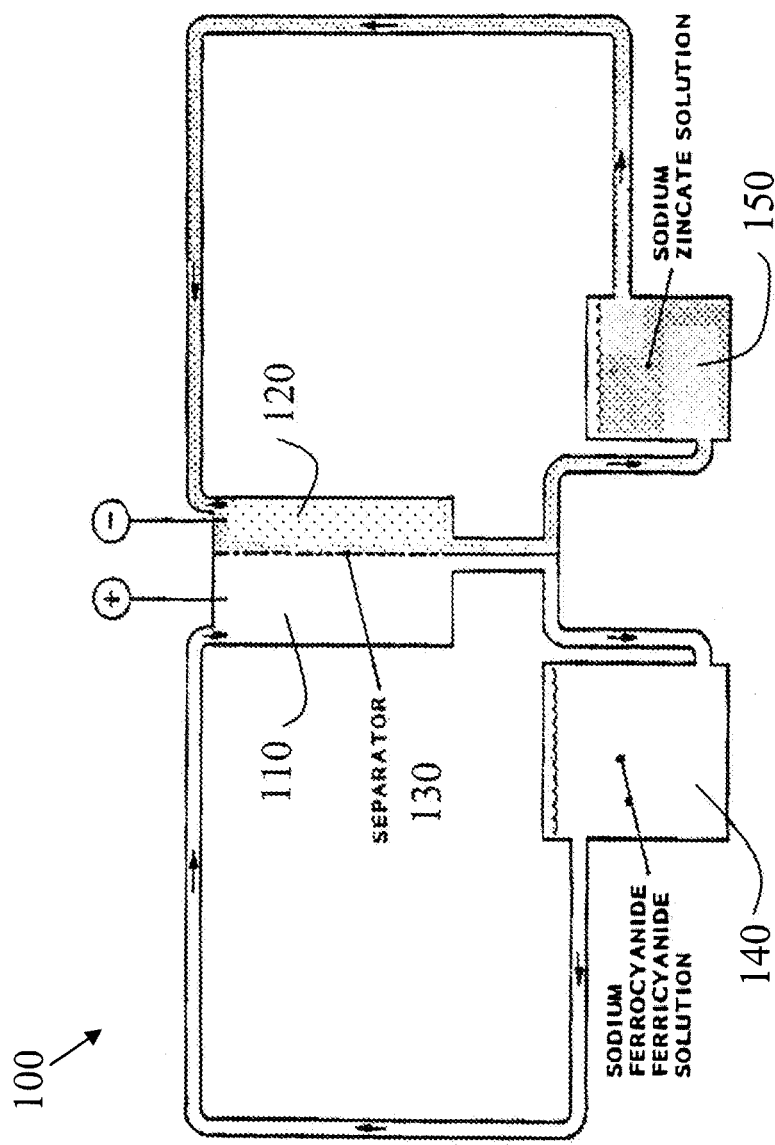
FIG. 1 is a schematic diagram of a zinc redox flow battery.

FIG. 1 shows an example of a prior art redox flow battery 100. See, for example, Wu et al. Indian Journal of Technology, vol. 24, July 1986, pp 372-380. The flow battery comprises positive and negative half cells 110 and 120, respectively, separated by separator 130. Electrolyte for the half cells is stored in tanks 140 and 150 and is pumped through the half cells, as shown by the arrows. The flow battery shown in FIG. 1 is a Zn/Fe redox flow battery; the posilyte is an Fe complex and the negalyte is a zincate salt. However, prior art flow batteries do not operate at high enough current densities and are not efficient enough to be economically viable for large scale energy storage. The present invention provides improvements to flow batteries that will allow high current density operation with high efficiency at low cost. For example, some embodiments of the present invention will provide redox flow batteries with charging current densities of 70, 80, 90, 100, 125, 150, 200 mA/cm$^2$ and even higher.

The alkaline zinc/ferro-ferricyanide ("ZnFe") rechargeable battery system of some embodiments of the present invention is intended for utility load leveling, load following, area regulation services, transmission & distribution deferral applications, wind and solar integration applications amongst other megawatt energy storage applications having an energy storage capacity from a few minutes, such as 15 minutes up to and exceeding 24 hours duration. The ZnFe battery is a hybrid redox flow battery in which the active materials (zinc oxide and sodium ferrocyanide) are stored in reservoirs external to the cell and brought to the site of electrochemical reaction as saturated solutions in a sodium hydroxide electrolyte.

During charge, energy is stored in the form of zinc metal deposited upon the zinc electrode substrate and as ferricyanide formed by anodic oxidation of the ferrocyanide reactant. When the demands of the load require, energy may be drawn from the cell by anodically dissolving the zinc to form zinc oxide with the simultaneous reduction of ferricyanide ions to ferrocyanide. These processes are highly reversible and selective, enabling the cell to operate with the advantages of high cycling efficiency, high cell voltage, random cycling and switch times of less than 5 ms from load to isolation or from isolation to full load.

Prior art flow batteries, especially Zn based, have problems with dendrite growth particularly as operating current density is increased during charging (deposition). For example, zinc dendrites may form during the deposition (charging) process in a zinc-based battery due to various causes. Zinc dendrites can cause problems in zinc-based batteries including a reduction in performance, cell short circuits and reduced operating lifetime all of which increase effective operating costs.

Embodiments of the present invention will provide higher performance (and thereby a lower operating cost) for zinc and other flow batteries by increasing the sustainable operating current density for charging and discharging of cells with reduced or minimized growth of dendrites. Flow battery embodiments of the invention, particularly for grid storage applications, generally will have power outputs approximately in the range from 20 kW to 25 MW and greater and energy outputs approximately in the range of 5 kWh to 600 MWh or discharge durations from 5 to 15 minutes to over 24 hours for a given power rating of the flow battery although higher and lower power and energy outputs can be used. Generally, the charge and discharge times are defined by the market application for a specific flow battery product. Typical discharge times are 15 minutes, 1, 2, 4, 8, 12, 16 and 24 hours. The ratio of charge to discharge time is generally in the range from 2 to 1 or 1 to 1 or 1 to 2, with approximately a 1 to 1 charge to discharge ratio being desirable.

Embodiments of high performance flow batteries, for example a ZnFe flow battery, of the present invention are based on a number of improvements over the prior art that will allow operation at high current densities and/or that lower battery overall operating costs.

First, the battery design has a cell comprising a low resistance positive electrode in at least one positive half cell and a low resistance negative electrode in at least one negative half cell, where the positive electrode and negative electrode resistances are selected for uniform high current density across a region of the cell stack—that is with a resistance across the electrodes sufficiently low to ensure small voltage variations across the electrode and hence uniform current flow out of the electrode and across at least a region of the cell (for example, voltage variations typically less than 5 to 10 mV where the resistance across a cell results in less than 200 my loss at an operating current density of 100 mA/cm$^2$, corresponding to a variation in current density of less than 20%.) Cells are often assembled together in series in a cell stack that includes multiple cells. The electrical connection between cells in the cell stack can be in the form of a bipolar electrode or other electrode designs including using wires to connect cells together in series and or parallel to make a cell stack. Typically multiple cell stacks are combined to make a battery system.

Second, a flow rate of electrolyte (for example, zinc species in the ZnFe battery) with a high rate of mixing is induced through at least one negative half cell in a Zn deposition region proximate a deposition surface where the electrolyte solution has sufficiently high zinc concentration for deposition rates on the deposition surface that sustain the uniform high current density across a cell or across substantially all of the cells in a cell stack. The flow in the negative half cell is engineered to provide substantially uniform deposition of zinc over the deposition surface. Furthermore, some embodiments are flow engineered to provide zinc deposition, where the zinc has a dense, adherent, non-dendritic morphology. The flow may be laminar with mixing elements or the mixing may be achieved through turbulent flow at high velocity or turbulent flow at lower velocity with turbulence elements added to a flow channel of the cell.

Third, the zinc electrolyte has a high concentration and in some embodiments has a concentration greater than the equilibrium saturation concentration, that is the zinc electrolyte is super-saturated with zinc ions. Different embodiments of the present invention combine one or more of these improvements.

The flow battery operating current density is a function of the concentration of active ion species. Some embodiments of the invention provide a super-saturated electrolyte to increase the concentration of ions particularly during charging. Zincate electrolyte can be manufactured with super-saturated zinc (Zn) ions through a chemical or electrochemical route. For example, zincate electrolyte can be manufactured with approximately ~1 to ~1.9 Molar zinc ions, which remains stable for in excess of one day. See Dirkse, Journal of the Electrochemical Society, Volume 128 (No. 7), July 1987, pp 1412-1415; Dirkse, Journal of the Electrochemical Society, Volume 134 (No. 1), January 1987, pp 11-13; and Debiemme-Chouvy & Vedel, Journal of the Electrochemical Society, Volume 138 (No. 9), September 1991, pp 2538-2542. Note that it is permissible to have zincate particles in the electrolyte provided that the particle size is small relative to the size of the electrolyte channel, that is, the flow channel of the cell. Furthermore, the electrolyte chemistry for the ZnFe flow battery has the added advantage of providing basic (high pH) electrolytes, which are less corrosive than many of the alternative electrolyte chemistries, which are more acidic. A basic chemistry is advantageous for the initial cost and longevity of components of the flow battery such as the plumbing and pumps used to feed the electrolyte flow to and from the cell stack of the flow battery.

High operating current density across the cell deposition surface and through the cell stack lowers the effective cost per unit power or energy output of the battery and lowers overall operating costs. Embodiments of the invention will provide sustainable higher operating current density by ensuring that dendrite growth is avoided or minimized particularly during charging (deposition).

Dendrite growth will be avoided or minimized by ensuring generally uniform operating current density across the deposition surface in the cell and by ensuring there is always an adequate, generally uniform and high concentration of ions in the electrolyte available at or close to the cell deposition surface where the ion concentration is consistent with the high operating current density and sufficient or greater than the concentration required to sustain the current density through deposition surface(s).

High current density operation with laminar flow of electrolyte through the cell flow channel without adequate mixing results in reduced ion concentration in the diffusion boundary layer at or close to the deposition surface which results in non-uniform deposition and dendrite growth. Operating the cell with an electrolyte flow regime that results in mixing (either with laminar flow or with turbulence) in the electrolyte flow through the cell flow channel increases the mass transfer coefficient and decreases the diffusion boundary layer thickness at the deposition surface which in turn increases the availability of ions for deposition. High availability of ions (for example zinc ion concentration in zincate in a ZnFe battery) allows higher current density operation without significantly depleting the electrolyte concentration in the uniform region of the cell deposition surface(s) and as a result with little or no dendrite growth.

The combination of both increased zincate ion concentrations in the electrolyte and increased mixing of the electrolyte in the cell flow channel near the deposition surface, both relative to prior art cells, will reduce or eliminate the formation of dendrites. This will allow sustainably increased high current density operation and will result in a smaller sized cell, smaller overall cell stack and smaller overall module which will decrease the cell, stack and module costs and overall operating costs for a given power and/or current output. These resulting capabilities will provide a more economic battery system and will lower the overall cost of energy and power output of a battery system.

Cell performance is enhanced by engineering the electrolyte flow and cell flow channel geometry to generate sufficient mixing or turbulence to reduce the diffusion boundary layer thickness at the deposition surface.

Tables 1 and 2 below shows illustrative values of high operating current density and associated average mass transfer coefficient ($k_m$) estimates for the flow in the cell flow channel according to embodiments of the present invention. The mass transfer coefficient relates the rate of mass transfer to the electrode surface (mol/cm$^2$.s) and the difference in concentration between the bulk of the solution and at the electrode surface (mol/cm$^3$). Mixing in the cell flow channel for increased operating current density can also be described in terms of the Sherwood Number or mean Sherwood Number ($Sh_m$) defined as the dimensionless mass transfer coefficient, also defined as the ratio of convective transport to diffusive transport of ions in the electrolyte. Note that the examples of Sherwood numbers in the tables below are calculated based on correlations for flow through 3D turbulent structures; however, other calculation methods may be used within the spirit and scope of the present invention. $i_L$ is the limiting current density, that is the current density at zero ion concentration in mA/cm$^2$ at the electrode surface (or electrode solid interface). $i_{app}$ is the favorable cell operating current density, defined for purposes of the examples in Table 1 as approximately ~⅔ times $i_L$ in mA/cm² (although those of skill in the art will recognize that other values or definitions may be used within the spirit and scope of various embodiments of the invention), v is the average flow velocity in cm/s of the electrolyte flowing through the cell flow channel. $C_b$ is the bulk concentration, i.e. the active ion concentration outside the diffusion boundary layer, mal. Tables 1 and 2 below also provide illustrative examples of these parameters. While these parameters and terms are familiar to those skilled in the art, additional details can be found in text books such as for example "Advanced Transport Phenomenon: Fluid Mechanics and Convective Transport" by L. Gary Leal Chapter 9, published by Cambridge University Press, in 2007, and "Unit Operations of Chemical Engineering" by Warren L. McCabe, Julian C. Smith and Peter Harriot, Chapter 21, published by McGraw Hill Inc ($V^{th}$ edition, 1993).

TABLE 1

Operational Range Examples with $C_b$ = 0.25 (mol/L)

| $I_{app}$ (mA/cm²) | 70 | 100 | 150 | 200 | 250 | 400 |
|---|---|---|---|---|---|---|
| $C_b$ (mol/L) | 0.25 | 0.25 | 0.25 | 0.25 | 0.25 | 0.25 |
| $i_L$ (mA/cm²) | 105 | 150 | 225 | 300 | 375 | 600 |
| $k_m$ (cm/s) | $2.3 \times 10^{-3}$ | $3.1 \times 10^{-3}$ | $4.6 \times 10^{-3}$ | $6.2 \times 10^{-3}$ | $7.8 \times 10^{-3}$ | $12.4 \times 10^{-3}$ |
| $Sh_m$ | 64 | 86 | 129 | 172 | 215 | 342 |

TABLE 2

Operational Range Examples with $C_b$ = 1 (mol/L)

| $I_{app}$ (mA/cm²) | 70 | 100 | 150 | 200 | 250 | 400 |
|---|---|---|---|---|---|---|
| $C_b$ (mol/L) | 1.0 | 1.0 | 1.0 | 1.0 | 1.0 | 1.0 |
| $i_L$ (mA/cm²) | 105 | 150 | 225 | 300 | 375 | 600 |
| $k_m$ (cm/s) | $5.3 \times 10^{-4}$ | $7.7 \times 10^{-4}$ | $1.2 \times 10^{-3}$ | $1.5 \times 10^{-3}$ | $1.9 \times 10^{-3}$ | $3 \times 10^{-3}$ |
| $Sh_m$ | 16 | 21 | 32 | 43 | 54 | 86 |

For cell operation in the approximate range of 70 to 400 mA/cm² the desirable mass transfer coefficient is between approximately $5 \times 10^{-4}$ and $1.24 \times 10^{-2}$ cm/s. For cell operation in the approximate range of 70 to 400 mA/cm² the desirable mean Sherwood number is between approximately 15 and 350.

Calculated zinc deposition thickness on the cell deposition surface(s) for 8 hours of charging operation for the following high current densities are shown in Table 3.

TABLE 3

Approximate Zinc Deposition Thickness for 8 Hours of Charging

| | current density (mA/cm²) | | |
|---|---|---|---|
| | 100 | 200 | 400 |
| deposit thickness (cm) | 0.17 | 0.34 | 0.68 |
| deposit capacity (mAh/cm²) | 800 | 1,600 | 3,200 |
| mass of deposit (g/cm²) | 0.976 | 1.951 | 3.902 |

Note that these thickness figures scale linearly with current density and time. For example, for a current density of 100 mA/cm², a growth rate of approximately 0.21 mm/hour is calculated; for a current density of 200 mA/cm², a growth rate of approximately 0.43 mm/hour is calculated; and for a current density of 400 mA/cm² a growth rate of approximately 0.85 mm/hour is calculated.

Although the examples provided herein are of ZnFe redox flow batteries, other redox flow batteries may be fabricated using the teaching and principles of the present invention. For example, the following batteries may be fabricated: ZnHBr; ZnBr; CeZn; and ZnCl.

Figure 2:
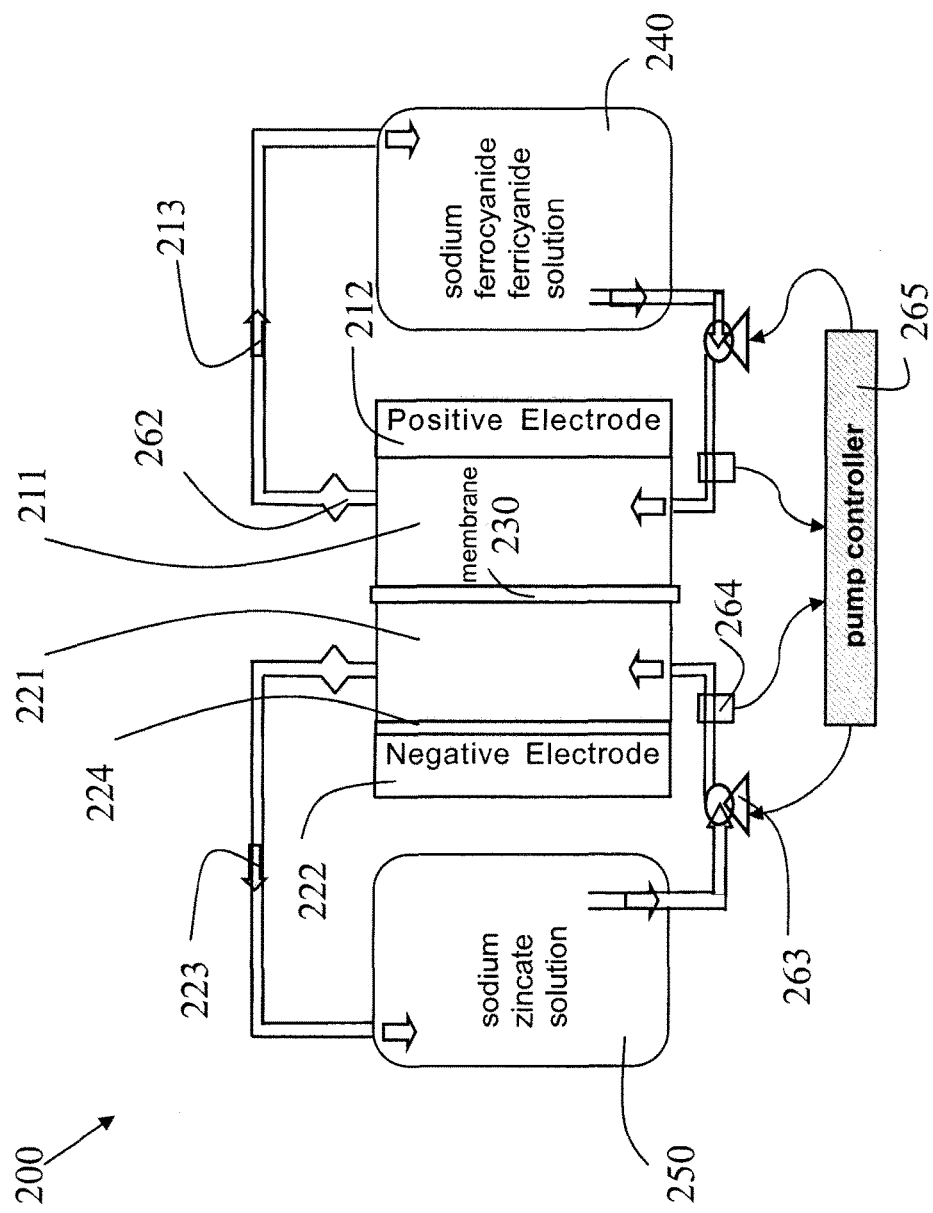
FIG. 2 is schematic diagram of a zinc redox flow battery, according to some embodiments of the present invention.
Figure 14:
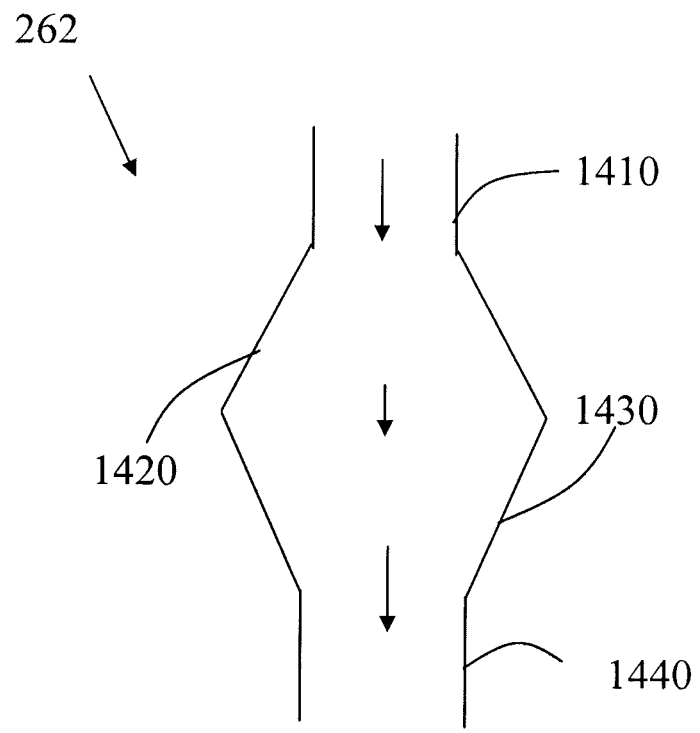
FIG. 14 is a cross-sectional representation of a flow laminarization feature, according to some embodiments of the present invention.

FIG. 2 shows a schematic representation of a flow battery 200, according to some embodiments of the present invention. FIG. 2 is an example of a ZnFe flow battery. The flow battery 200 has a positive electrode 212, a negative electrode 222 on the surface of which there is a zinc plating zone 224, and a membrane 210 separating a positive channel 211 and a negative channel 221. The flow of electrolyte through the separate channels in the cell and through the rest of the fluid circuits is indicated by arrows 213 and 223, for the posilyte and negalyte circuits, respectively. Each fluid circuit includes a cell channel (211 and 221), an optional flow calming feature 262 (such as shown in FIG. 14), an electrolyte reservoir (240 which in this example contains the posilyte—sodium ferrocyanide/ferricyanide solution and 250, which in this case contains the negalyte sodium zincate solution), a pump 263 and flow sensor(s) 264. The pumps 263, sensors 264 and pump controller 265 are configured to control the flow of electrolyte through the cell, including control of the flow regime in the cell—the flow regime may be laminar, mixing, and/or turbulent flow as described throughout this application.

The amount of electrolyte pumped through each side of the electrochemical cell is determined by calculation of the cell channel volume, the rate of electrolyte flow and the amount of zincate depletion desired at the cell exit chamber with consideration for the energy storage duration and piping volumes and pipe run lengths defining the electrolyte storage tank sizes. For a given amount of electrolyte per cell stack, a pump size is selected using materials of construction having durability and long life under conditions of strong base (e.g. 2 to 5 N NaOH) or strong acid depending upon the nature of the electrolyte used in the electrochemical cell. Typically, two pumps are selected for each cell stack, one for each electrolyte. Generally acceptable materials of construction include polypropylene, polyethylene, fluorinated polymers, polyetherketones, polysulfones, polyphenylene sulfide and the like. Various sensors are selected to measure the fluid velocity, direction of fluid flow, temperature, pressure and other metrics at various locations in the storage tanks, piping, pumps, entrance and exit points of the cell channel. The various data signals from each sensor are transferred by signal wire or by wireless transfer to a data control system. The data control system records the data flow, and uses algorithms, set points and control inputs to send data signals to fans (for cooling, if required), valves and motors to control (e.g. increase, decrease or hold) motor speeds and valve positions which in turn increase, decrease, hold constant or change fluid directions on command. The data control system may under certain conditions send alarm signals and other performance data to remotely located control rooms. The piping to and from the cell channel is designed and sized to minimize shunt current loses and the materials of construction are selected for durability under conditions of strong base or strong acid depending upon the nature of the electrolyte. The electrochemical system is generally sited inside a fluid containment system comprising appropriate sensors and alarms to indicate any electrolyte leaks.

Figure 3:
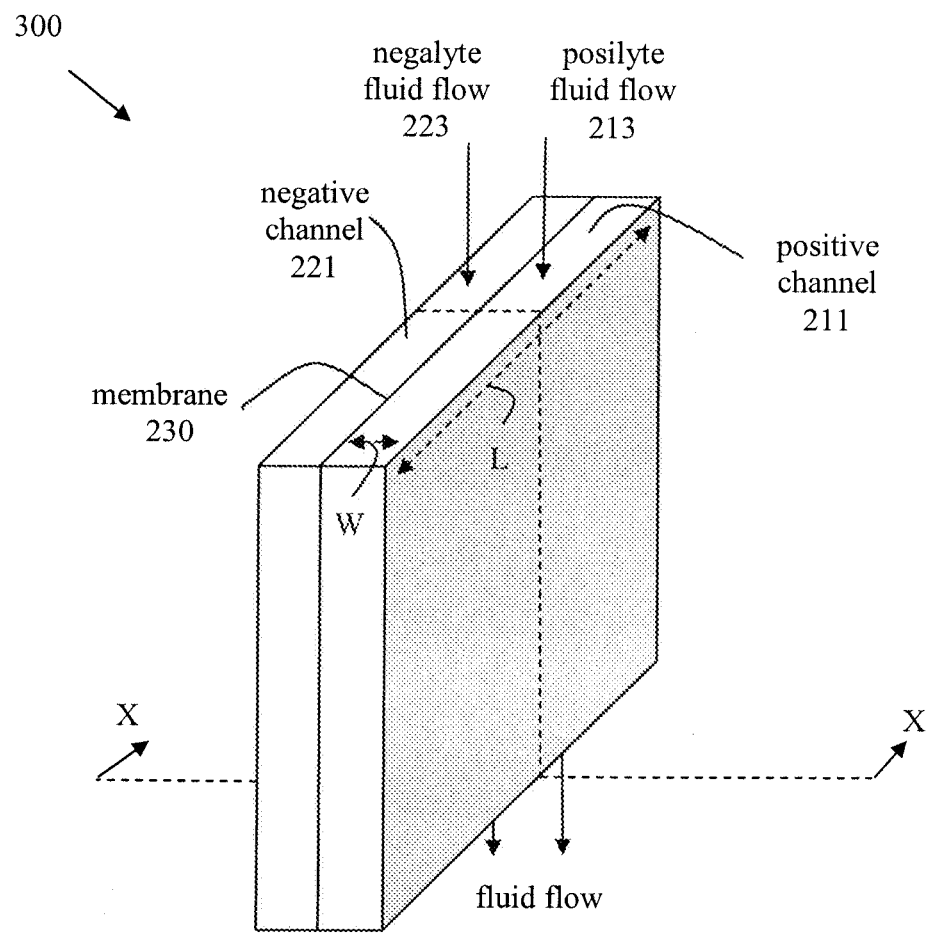
FIG. 3 is a schematic perspective view of a flow cell, according to some embodiments of the present invention.
Figure 7:
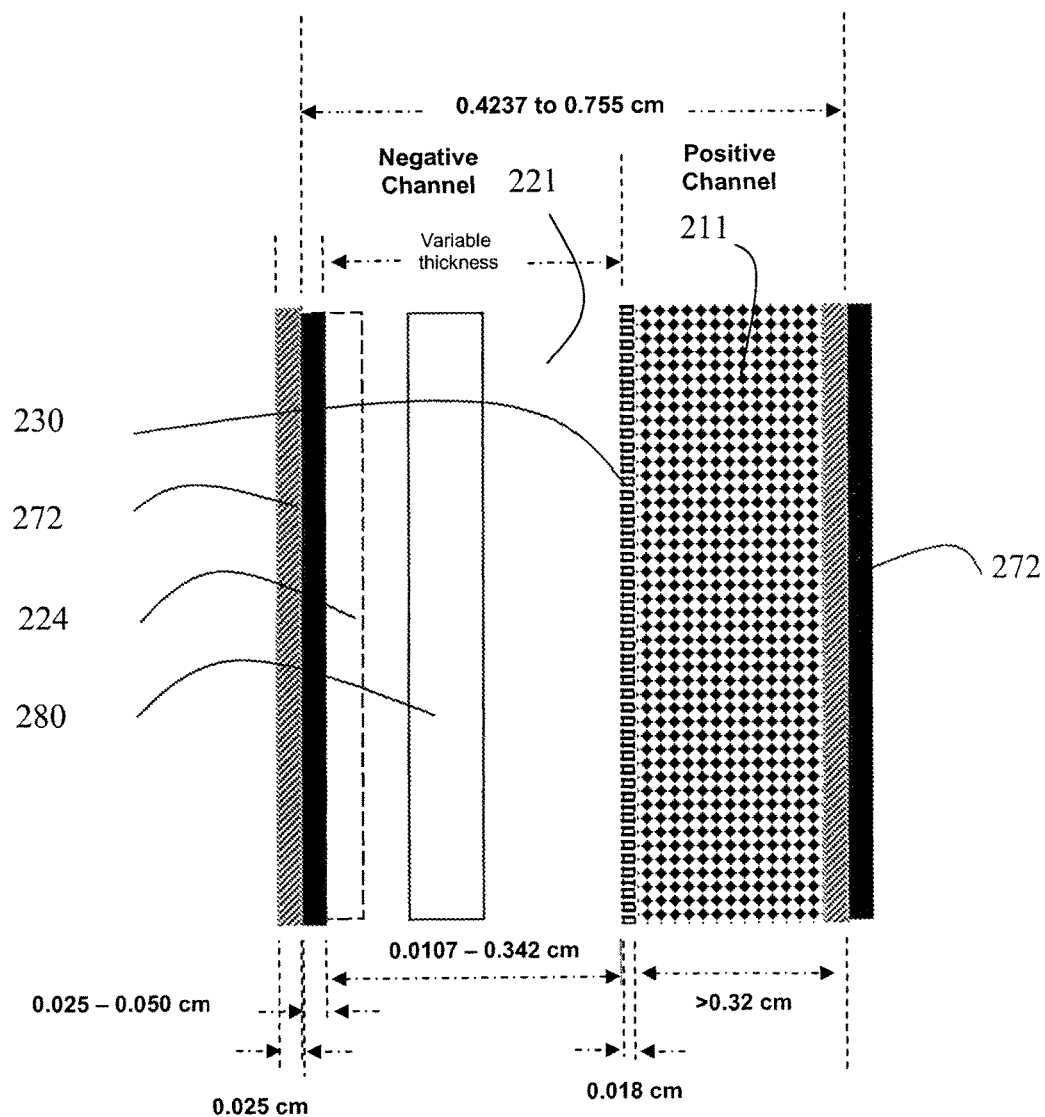
FIG. 7 is a schematic cross-sectional representation of a third example of cell configurations for a redox flow battery, according to some embodiments of the present invention.

FIG. 3 shows a schematic perspective view of a cell 300. The cell 300 may be roughly 0.5 cm thick, with larger dimensions of roughly 30 cm×30 cm up to 132 cm×67 cm, for example. A cross-sectional view of the section X-X is shown in FIG. 7. FIG. 3 shows a cell 300 with bipolar structural elements on either side. The cell has positive 211 and negative 221 channels separated by a membrane 230. A negalyte is pumped through the negative channel and a posilyte is pumped through the positive channel, as shown; posilyte fluid flow and negalyte fluid flow are shown by arrows 213 and 223, respectively. Further details of the cell are provided above with reference to FIG. 7.

Figure 4:
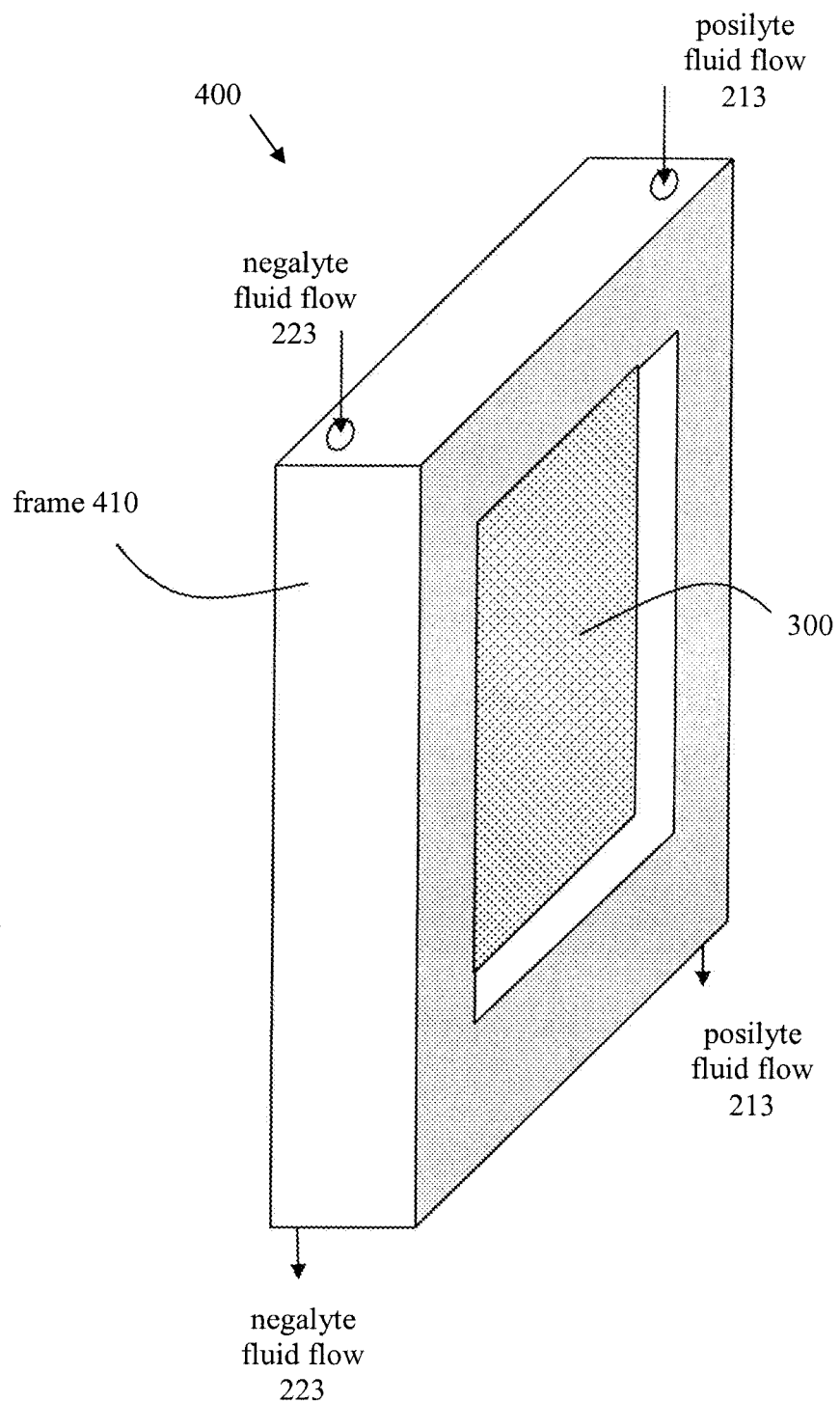
FIG. 4 is a schematic perspective view of the cell of FIG. 3 contained within a frame, according to some embodiments of the present invention.

FIG. 4 shows the cell 300 of FIG. 3 in a frame 410. The cell 300 is surrounded by the frame 410 that serves to hold the membrane (separator) and bipolar structural elements in place, creating the flow channels, sealing the edges of the flow channels, providing a place to attach the electrolyte flow and return pipes and, optionally, may contain electrolyte distribution manifolds and flow calming features. Flow of posilyte and negalyte into and out of the frame for provision to the cell 300 is indicated by arrows 213 and 223, respectively.

Figure 5:
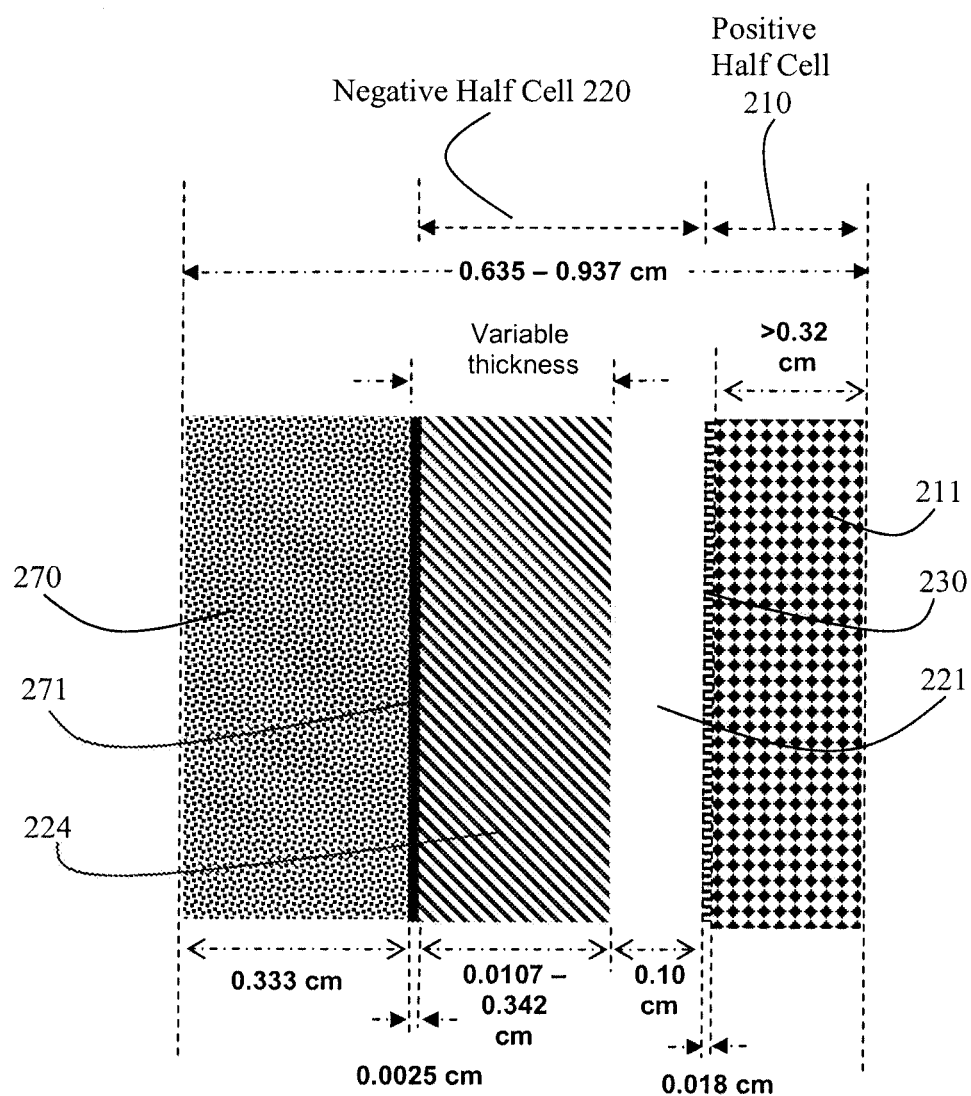
FIG. 5 is a schematic cross-sectional representation of a first example of cell configurations for a redox flow battery, according to some embodiments of the present invention.
Figure 6:
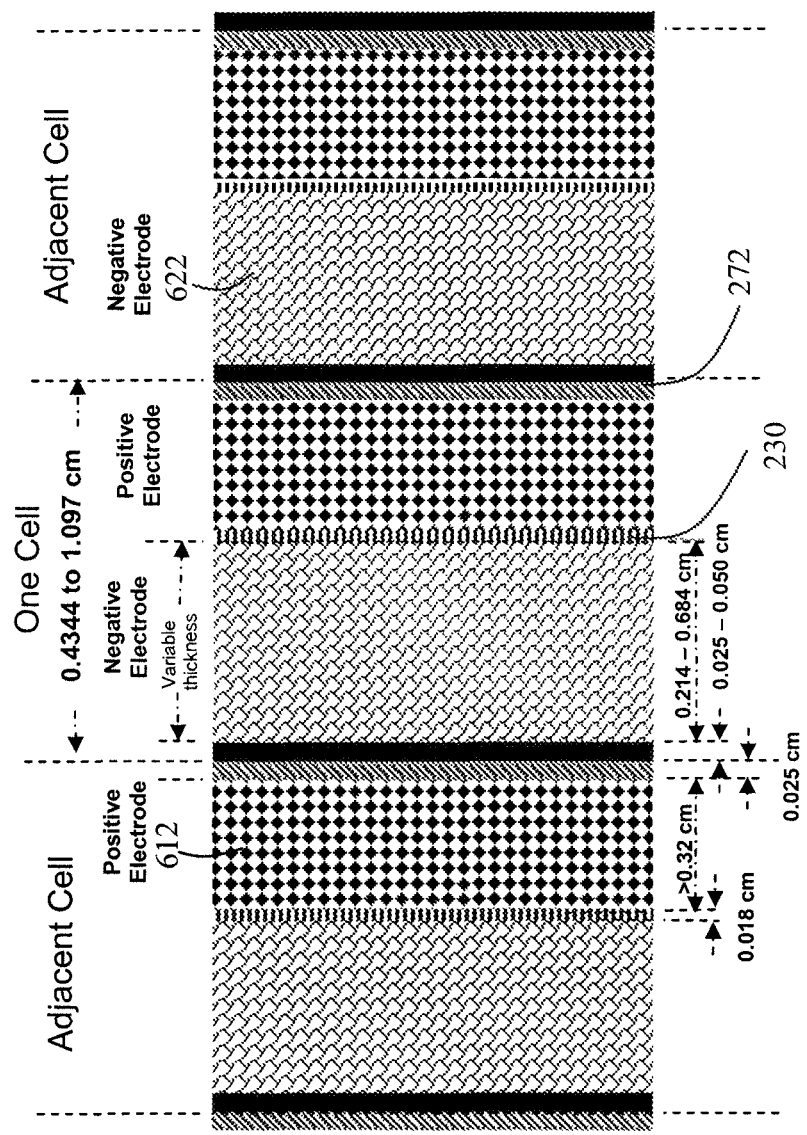
FIG. 6 is a schematic cross-sectional representation of a second example of cell configurations for a redox flow battery, according to some embodiments of the present invention.

More detailed examples of cells according to some embodiments of the present invention are provided in FIGS. 5-7. The cells may have large dimensions of 30 cm×30 cm, 90 cm×90 cm, 60 cm×90 cm, 45 cm×90 cm, or 132 cm×67 cm, for example. Examples of the cross-sectional dimensions of the components of the cells are provided in FIGS. 5-7. However, the present invention is not limited to these cell dimensions and may be used with cells of smaller or larger dimensions. The cells are shown in cross-section, and the section is perpendicular to the larger surface of the cell. (For example, see section X-X in FIG. 3.) The power density is a function of the cell chemistry and the cell current density. For ZnFe at 200 mA/cm$^2$, for example, the discharge power density is about 0.3 W/cm$^2$. For the cell dimensions listed above, the resulting power per cell will be approximately 274 W, 2.43 kW, 1.60 kW, 1.22 kW and 2.45 kW, respectively.

FIG. 5 shows a first example of a schematic cross-section of a bipolar ZnFe redox flow battery cell of the present invention. A single battery cell is shown comprising a negative half cell 220, a positive half cell 210 and a bipolar structural element 270. The bipolar structural element 270 separates the positive half cell from the negative half cell of adjacent cells. (See FIG. 6.) The bipolar structural element 270 in this example is a 50% graphite fiber/PPS interconnector on which there is a cadmium metal strike 271. (PPS is polyphenylene sulfide. Other polymer materials can be used in place of PPS in the construction of bipolar structural elements, such as polyetherketones, polysulfones, polyethylenes, polypropylenes and the like in combination with conductive fillers such as graphite fiber or flakes, certain carbon powders and carbon blacks, carbon nanotubes, conductive metal powders, and the like.) The positive half cell 210 comprises a porous Ni mesh redox electrode, which completely fills the positive channel 211—the posilyte flows through the porous Ni mesh redox electrode. The negative half cell 220 includes a Zn plating zone 224 of variable thickness on the Cd metal strike 271 and a negalyte flow channel 221. The positive half cell and the negative half cell of an individual cell are separated from each other by a membrane 230, made of material such as Nafion-114 or another separator material. The membrane 230 keeps the zincate and iron electrolytes separated, but Na ions and water are able to move through the membrane. The membrane material can be a separator material with or without grafted ionic chemical species.

In order to operate the bipolar cell of FIG. 5 at a high current density, for example a charging current density of 200 mA/cm$^2$, a high mass transfer rate is generated in the negative flow zone. This may be achieved by increasing the mixing rate and/or by increasing the electrolyte fluid flow rate, above that of prior art cells. This may be done by adding mixing elements to the cell channel, or by increasing the velocity without reaching the turbulent flow regime, or by increasing the velocity until turbulent flow is achieved, or by introducing turbulence generating elements as discussed below. Note that zinc deposition current density is a function of fluid (electrolyte) velocity and Reynolds number. See R. D. Naybour, "The Effect of Electrolyte Flow on the Morphology of Zinc Electrodeposited from Aqueous Alkaline Solution Containing Zincate Ions" J. Eletrochem. Soc. pages 520-525, April 1969. Note that the deposition operating current density is a function also of the concentration of the active species.

FIG. 6 shows a second example of a schematic cross-section of a bipolar ZnFe redox flow battery cell. The positive electrode 612 comprises a porous Ni mesh redox electrode attached to a bipolar Ni/Cu electrode 272—the Ni mesh being attached to the Ni face of the bipolar electrode. The posilyte flow zone is occupied by the porous Ni mesh. The negative electrode 622 may comprise a Cd, Sn or Pb coated high surface area Cu or Ni mesh, which is 60% to 98% porous, for example. The coated Cu or Ni mesh is attached to the Cu face of the bipolar electrode 272. The coated Cu or Ni mesh occupies the negalyte flow zone and the mesh generates mixing in the negalyte flow, without requiring high fluid velocity. The cell is set up so that the coated Cu or Ni mesh may be plated with Zn up to approximately 20% to 70% of volume. FIG. 6 also illustrates how the bipolar electrode 272 (or the bipolar structural element 270 of FIG. 5) separates the cell from adjacent cells and facilitates the efficient and cost-effective construction of a cell stack. Adjacent cells are shown in FIG. 6.

FIG. 7 shows a third example of a schematic cross-section of a bipolar ZnFe redox flow battery cell. (FIG. 7 is section X-X in FIG. 3.) The positive channel 211 comprises a porous Ni mesh redox electrode attached to a bipolar Ni/Cu electrode 272—the Ni mesh being attached to the Ni face of the bipolar electrode. The posilyte flow zone is occupied by the porous Ni mesh. The negative channel 221 includes a zinc metal plating zone 224 and features 280 configured to induce efficient mixing or turbulence. Examples of features 280 are shown in FIGS. 8-13 and are described below. (Note that features 280 may be positioned in the flow channel above the deposition surface as shown in FIG. 7, or in other embodiments may be positioned directly on the deposition surface, as shown in FIGS. 11-13-FIGS. 8-10 show structures that may be either positioned on the deposition surface or above it.) These features are designed to generate a high rate of mixing of the flow while not necessarily requiring high velocity (and therefore high pumping power dissipation). Zn metal is plated on the Cu face of the bipolar electrode 272. The Cu face may alternatively also be coated with Cd, Sn or Pb. Note that the cylinders, cones and pyramids shown in FIGS. 11-13 will be made of non-conducting material and are shown to have sharp edges and points. However, if it is desired to make the cylinders, cones and pyramids of conductive material then they should have blunt edges and ends rather than sharp edges and points. (Note that in order to improve the uniformity of Zn plating, the features used to induce mixing and/or turbulence should not have sharp points or edges if they are conductive—sharp points and edges are electric field concentrators and lead to undesirable non-uniform plating and even dendrite formation.) Furthermore, the features should not occupy too large a volume such that flow through the anode channel is unduly impeded—see below for further details.

Note that the conditions under which turbulent flow is induced can be conveniently defined for a particular channel geometry by using, for example Reynolds numbers. Those skilled in the art are familiar with the calculation of Reynolds numbers, including for channels that contain features such as those shown in FIGS. 8-13. Roughly, for the cell illustrated in FIG. 7 with a substantially rectangular channel, a Reynolds numbers of at least approximately greater than 1,300 or preferably 2,000 may be used to ensure turbulent flow where the characteristic length is defined through hydraulic diameter. The hydraulic diameter for a narrow flow channel (L>>W) is twice the thickness of the channel, i.e. 2 W, where L and W are the length and width of the flow channel, as measured perpendicular to the direction of fluid flow. (See FIG. 3.)

For the cell shown in FIG. 7 incorporating the features shown in FIGS. 8-13, lower Reynolds number may suffice to ensure efficient mixing or a high rate of mixing, for example Reynolds numbers of at least approximately 8 or greater may suffice to ensure efficient mixing. However, the specific Reynolds number will vary with the cell and flow channel design and mixing feature.

Figure 8:
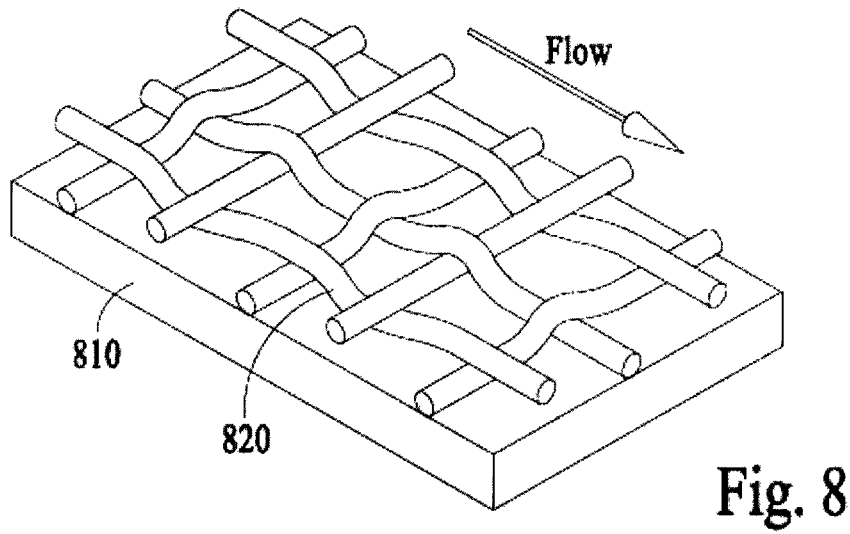
FIG. 8 is an example of a mixing inducing woven wire mesh feature on the surface of a flow battery electrode, according to some embodiments of the present invention.

FIG. 8 shows an example of a structure suitable for inducing mixing or turbulence in the electrolyte flow over the surface of a flow battery electrode. A small section of woven wire mesh 820 is shown on part of the surface of the electrode 810. The direction of electrolyte flow is indicated by the arrow; the flow being generally parallel to the surface of the electrode 810. The wire mesh 820 disrupts the fluid flow, inducing desirable mixing in either laminar, semi-turbulent or turbulent flow over the electrode surface. Note that a similar effect may also be achieved by having the mesh close to, but not necessarily on, the surface of the electrode 810. A suitable wire diameter will be between 20% and 50% of the channel thickness.

In some embodiments the wire mesh is conductive and acts as part of the electrode surface thereby increasing the total electrode surface area (in addition to the mesh acting as a mixing element). In other embodiments, the mesh is non-conductive and mixes the flow on the surface of the planar electrode. A non-conductive mesh can also be used to ensure a specified electrode-to-membrane spacing when it is sandwiched between the electrode and membrane. In yet other embodiments, there can be several layers of mesh, some conductive and some non-conductive. In one such example, a conductive mesh is adjacent to the electrode and a non-conductive mesh is between the conductive mesh and the membrane. The non-conductive mesh acts as a spacer to keep the plating surfaces away from the membrane, as well as, acting as a flow mixing structure. Non-conductive mesh can be made of plastic or other non-conductive or low conductivity materials. In yet further embodiments, there may be a series of adjacent meshes with varying electrical conductivity. This structure will determine the local electrical field which controls the local current distribution and hence the plating uniformity.

Figure 9:
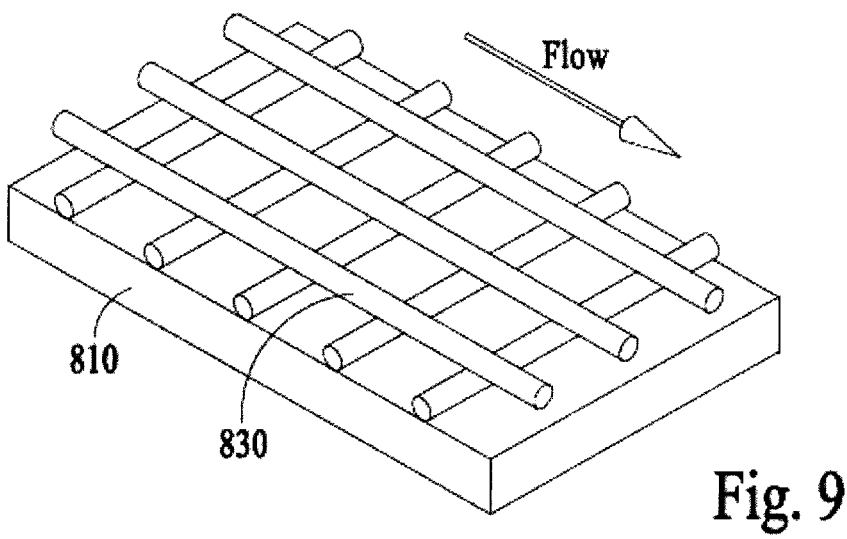
FIG. 9 is an example of a mixing inducing non-woven wire mesh feature on the surface of a flow battery electrode, according to some embodiments of the present invention.

FIG. 9 shows another structure suitable for inducing mixing in laminar or turbulent electrolyte flow. A small section of non-woven wire mesh 830 is shown on part of the surface of the electrode 810. The direction of electrolyte flow is indicated by the arrow; the flow being generally parallel to the surface of the electrode 810. The wire mesh 830 disrupts the fluid flow, inducing desirable mixing in laminar or turbulent flow over the electrode surface. Note that a similar effect may also be achieved by having the mesh close to, but not necessarily on, the surface of the electrode 810. A suitable wire diameter will be between 10% and 50% of the channel thickness. Multiple wires may be stacked or spaced across the cell channel to further enhance performance in some embodiments.

Figure 10:
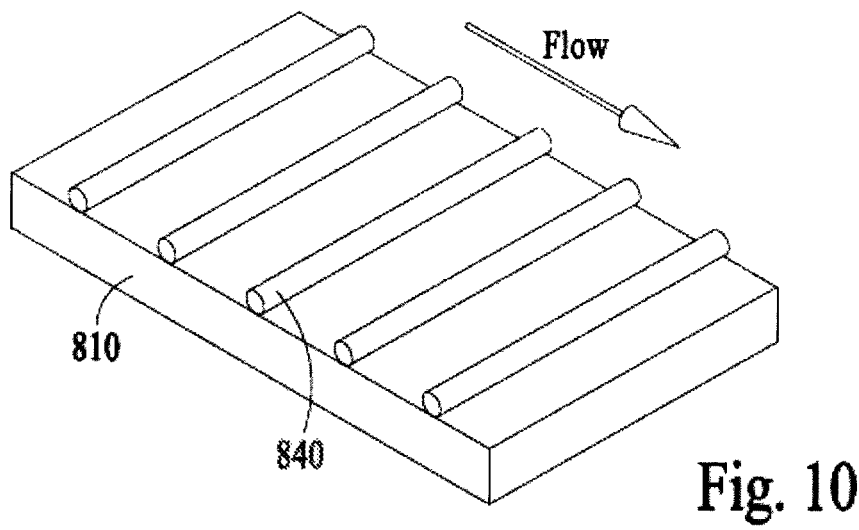
FIG. 10 is an example of a mixing inducing wire/tube feature on the surface of a flow battery electrode, according to some embodiments of the present invention.

FIG. 10 shows yet another structure suitable for inducing mixing in laminar or turbulent electrolyte flow. Parallel wires/tubes 840 are shown on part of the surface of the electrode 810. The direction of electrolyte flow is indicated by the arrow; the flow being generally parallel to the surface of the electrode 810 and perpendicular to the long axes of the wires/tubes. The wires/tubes 840 disrupt the fluid flow, inducing desirable turbulent (non-laminar) flow over the electrode surface. Note that a similar effect may also be achieved by having the wires/tubes close to, but not necessarily on, the surface of the electrode 810. A suitable wire diameter will be between 10% and 90% of the channel thickness.

Figure 11:
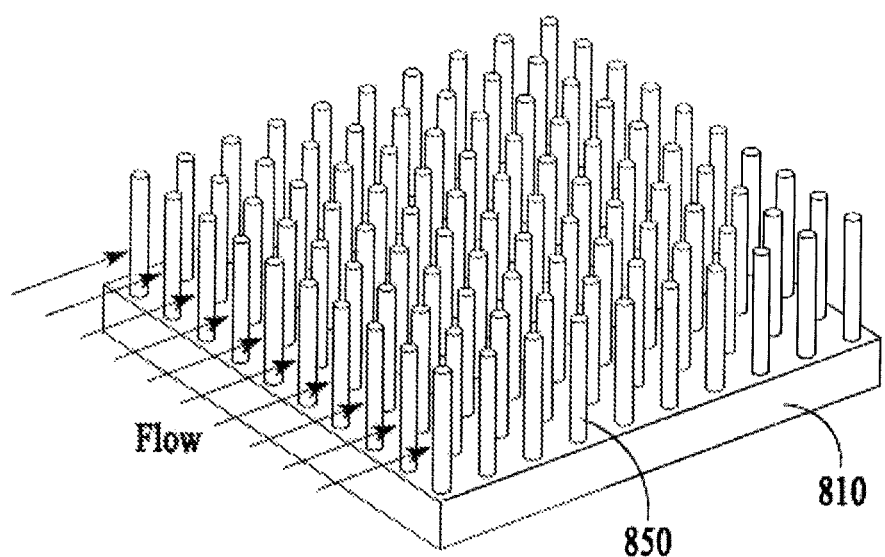
FIG. 11 is an example of a mixing inducing array of cylinders on the surface of a flow battery electrode, according to some embodiments of the present invention.

FIG. 11 shows part of an array of features for inducing mixing in laminar or turbulent electrolyte flow. An array of cylinders 850 is shown on part of the surface of the electrode 810. The direction of electrolyte flow is indicated by the arrows; the flow being generally parallel to the surface of the electrode 810. The array of cylinders 850 disrupts the fluid flow, inducing desirable mixing in the flow over the electrode surface. The cylinders as shown are formed of non-conductive material and may have sharp edges. A suitable cylinder height is between 20% and 100% of the channel thickness. The spacing and diameter must be such as to generate turbulence at the desired flow rate.

Figure 12:
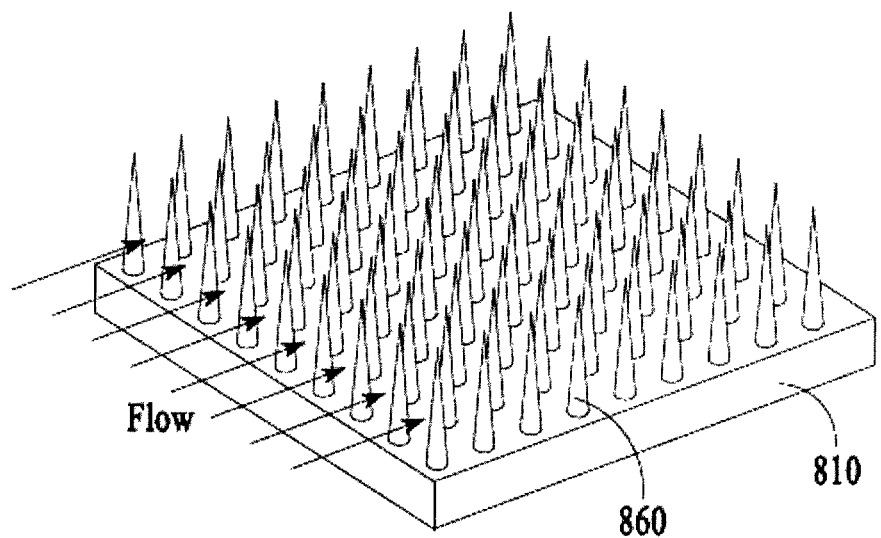
FIG. 12 is an example of a mixing inducing array of cones on the surface of a flow battery electrode, according to some embodiments of the present invention.

FIG. 12 shows part of another array of features for inducing mixing in laminar or turbulent electrolyte flow. An array of cones (or tapered cylinders) 860 is shown on part of the surface of the electrode 810. The direction of electrolyte flow is indicated by the arrows; the flow being generally parallel to the surface of the electrode 810. The array of cones 860 disrupts the fluid flow, inducing desirable mixing in laminar or turbulent flow over the electrode surface. The tapered cylinders as shown are formed of non-conductive material and may have sharp points. A suitable cylinder height is between 20% and 100% of the channel thickness. The spacing and diameter must be such as to generate mixing while not unduly increasing the flow resistance as the channel is reduced in thickness as the Zn deposit increases in thickness.

Figure 13:
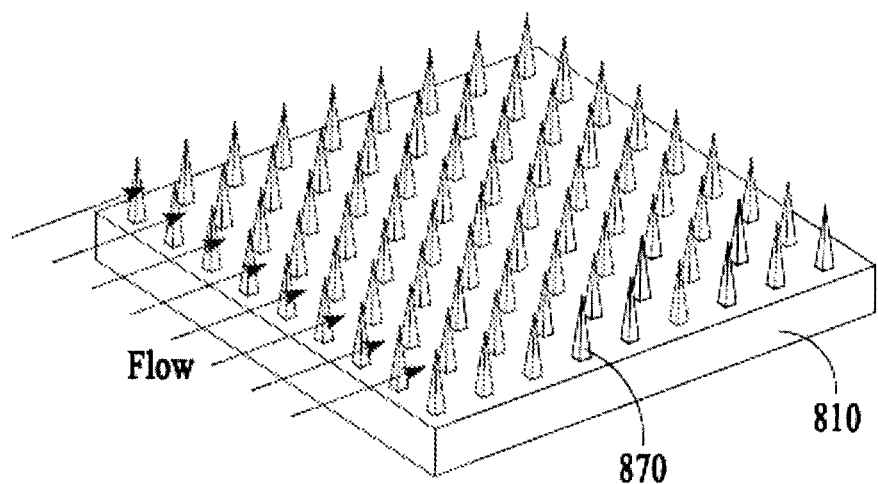
FIG. 13 is an example of a mixing inducing array of pyramids on the surface of a flow battery electrode, according to some embodiments of the present invention.

FIG. 13 shows part of yet another array of features for inducing mixing in the electrolyte flow. This is to illustrate that shapes other than cylinders are suitable. An array of pyramids 870 is shown on part of the surface of the electrode

810. The direction of electrolyte flow is indicated by the arrows; the flow being generally parallel to the surface of the electrode 810. The array of pyramids 870 disrupts the fluid flow, inducing desirable mixing of the flow over the electrode surface. The tapered features as shown are formed of nonconductive material and may have sharp edges and may have other cross-sections, for example triangular, other polygon or oval. A suitable feature height is between 20% and 100% of the channel thickness. The spacing and diameter must be such as to generate mixing at the desired flow rate. The taper may be chosen to maintain a high rate of mixing while not unduly increasing the flow resistance as the channel is reduced in thickness as the Zn deposit increases in thickness.

FIGS. 8-13 provide a range of examples of features that may be used to induce mixing in the electrolyte flow over the surface of the electrode. However, these examples are not intended to be a comprehensive listing, and further features suitable for inducing mixing in laminar and/or turbulent flow will be apparent to these skilled in the art after reading this disclosure. For example, further features may include: combinations of the above described features; conductive and non-conductive meshes; ribbons; foam structures; and other arrangements of wires or tubes.

The arrays shown in FIGS. 11-13 are shown as regular arrays of features; however, these arrays may also have randomly positioned features, or partially randomly positioned features.

The features of FIGS. 8-13 are shown on the surface of a flow battery electrode. However, such features may alternatively, or in addition, be located in the electrolyte stream immediately prior to the electrolyte flowing across the electrode; the features may be attached, for example to the inner surface of the plumbing that delivers the electrolyte into the half cell.

In commercial flow battery operation the power consumed by the pumping system is an important factor in optimizing overall productivity of the battery system. While high fluid pumping rates induce higher degrees of mixing in the cell they also demand more pumping power that ultimately detracts from the power and energy delivered by the battery system. Higher pumping rates also causes higher wear and therefore more frequent preventive maintenance. Pump power, mixing and turbulence can be traded off against each other in battery design. Laminar flow inside and outside of the cell and through the pipes to and from the cell generally reduces pumping power requirements. When operating with turbulence for mixing the electrolyte in the flow channel of a cell, the turbulence can be quenched for example by allowing for a lower velocity region in which flow velocity is reduced and laminar flow resumed, for example using structures such as illustrated in FIG. 14. Ensuring flow outside of any intentional turbulent region of the cell is laminar or substantially laminar reduces pump power consumption.

FIG. 14 shows a cross-section of a modified pipe at the exit from a half cell, the pipe is designed to calm the turbulent flow and provide a laminar flow as the electrolyte moves through the rest of the plumbing. The turbulently flowing electrolyte flows from the half cell into a first segment of pipe 1410. The electrolyte then enters a second segment of pipe 1420 in which the cross-section of the pipe increases. As the pipe 1420 cross-section increases, the velocity of the electrolyte decreases and the turbulent flow is calmed, resulting in a laminar flow. The laminar flowing electrolyte then enters a third section of pipe 1430 in which the pipe cross-section decreases, so as to funnel the calmed electrolyte into the plumbing 1440 that continues the electrolyte circuit. The direction of electrolyte flow is indicated by the arrows.

The flow of electrolyte through the cell flow channel may be reversed to improve mixing, uniformity of deposition and to avoid depletion of electrolyte at the deposition surface.

Standoffs can be used to support a mesh (or screen) mixing element in the flow channel to avoid it contacting the membrane or electrode and generally to avoid bowing or buckling of the mesh due to high flow rate, turbulence or temperature variation.

Those of skill in the art will be aware of many definitions and measures of turbulence. Turbulence in this context generally means variations in flow velocity (velocity being a vector, and variations including both variations in the speed and direction of flow) including to cause mixing of the electrolyte flow to avoid depletion of the deposited ion at or close to the deposition surface during deposition (charging) or removal during discharge.

Definition of substantially uniform deposition on a deposition surface of the cell during charging means deposition without or with reduced dendrite formation during the charging period. Those of skill in the art will recognize that some variation of deposition thickness across the deposition surface and across the cell (perhaps less than 20%) are inherent, particularly when in operation at high current density and with high concentration of ions in the electrolyte.

A high rate of mixing generally means mixing in laminar or turbulent flow to avoid or minimize depletion of the plating on particularly at or close to the deposition surface. A high rate of mixing for use with various embodiments can be achieved as follows: (1) with a channel and off deposition surface mixing device; (2) with a channel and on deposition surface mixing device; (3) with a channel with both on and off deposition surface mixing devices; or (4) with a channel, mixing device and high electrolyte velocity.

First, a high rate of mixing may be achieved when the mixing element or device is located at a distance from the electrode deposition surface of at least approximately twice the diffusion boundary layer thickness and has a cross-sectional area of approximately 10% to 80% of the cell channel cross-sectional area, desirably from approximately 25% to 60%, or a high rate of mixing can be achieved when the mixing device is located at a distance from the electrode deposition surface of at least approximately 125 microns and has a cross-sectional area of approximately 10% to 80% of the cell channel cross-sectional area, preferably from approximately 25% to 60%; or a high rate of mixing can be achieved when the mixing element or device is located at a distance from the electrode deposition surface of at least approximately twice the diffusion boundary layer thickness and have a cross-sectional area of approximately 10% to 80% of the cell channel cross-sectional area, preferably from approximately 25% to 60%, where the mixing device has a repeating feature (or approximately repeating feature) across the cell channel width and along the cell channel length; or a high rate of mixing can be achieved when the mixing element or device is located at a distance from the electrode deposition surface of at least approximately twice the diffusion boundary layer thickness and have a cross-sectional area of approximately 10% to 80% of the cell channel cross-sectional area, preferably from approximately 25% to 60%, where the mixing device has a repeating feature (or approximately repeating feature) across the cell channel width and along the cell channel length and the spacing interval of the repeating feature along the cell channel length is at least approximately 1.1 times the spacing interval of the repeating feature across the channel width.

Second, a high rate of mixing can be achieved when a mixing element or device or devices are attached to the electrode deposition surface and the ratio of the mixing device leading edge repeat distance is at least approximately five times the mixing device height from the electrode deposition surface, and the shape of the mixing device can be selected from the group comprising a wire, mesh, screen, a semi-spherical, round, semi-round or rectangular shape or other shapes or combinations.

Third, a good rate of mixing can be achieved when a mixing element or device or devices are attached to the electrode deposition surface in combination with a second mixing device that is located at a distance from the electrode deposition surface of at least approximately twice the diffusion boundary layer thickness and has a cross-sectional area of approximately 10% to 80% of the cell channel cross-sectional area, preferably from approximately 25% to 60%.

Fourth, a high rate of mixing can be achieved when the mixing element or device is located at a distance from the electrode deposition surface of at least approximately twice the diffusion boundary layer thickness and have a cross-sectional area of approximately 10% to 80% of the cell channel cross-sectional area, preferably from 25% to 60%, and the electrolyte fluid velocity is at least approximately 5 cm/s, preferably at least approximately 25 cm/s and more preferably at least approximately 50 cm/s.

In some applications, flow batteries, such as some embodiments of the present invention, may be used for frequency regulation. Furthermore, some embodiments of the present invention may be used for other short duration power needs such as UPS (uninterruptable power system) or short response power backup. For short duration power needs some embodiments of flow batteries of the present invention may be operable at high charging and discharging current densities, such as greater than roughly 200 mA/cm$^2$.

In other embodiments the flow battery may include one or more of the following: a Reynolds Number of the flow channel is greater than approximately 1300; a Sherwood Number of the flow channel is greater than approximately 21; the uniform high current density is >100 mA/cm; there is at least one mixing element in the flow channel; there is at least one turbulence inducing element in the flow channel; the mass transfer coefficient is greater than approximately $77 \times 10^{-4}$ m/s; and the charging cycle is at least 5 minutes in duration or is at least one hour in duration.

In some embodiments, the high performance flow battery may comprise a stack of cells with a sustainable operating current density in a region of a cell in the cell stack during a charging cycle of >100 mA/cm$^2$. In some embodiments, the high performance zinc-based flow battery may comprise depositing zinc on a deposition surface in a cell of the battery at a rate greater than 0.1 mm per hour, and in other embodiments at a rate greater than 0.2 mm per hour. Furthermore, in some embodiments a method of charging a high performance ZnFe flow battery may comprise growing or depositing zinc on a deposition surface of a cell in the battery at a rate greater than 0.1 mm per hour, and in other embodiments at a rate greater than 0.2 mm per hour or greater than 0.4 mm per hour.

In another embodiment, a high performance redox flow battery comprises at least one cell comprising a low resistance positive electrode in at least one positive half cell and a low resistance negative electrodes in at least one negative half cell where a resistance of the low resistance positive electrode and a resistance of the low resistance negative electrode is small enough for uniform high current density across a region of a deposition surface of the at least one cell, an electrolyte flow through a flow channel of at least one half cell with a high rate of mixing in a deposition region proximate the deposition surface where the electrolyte has sufficiently high concentration of an active ion species for deposition rates on the deposition surface that sustain the uniform high current density through the deposition surface during a charging cycle, a mass transfer coefficient of the flow proximate the deposition surface at least enough to maintain sufficient electrolyte concentration proximate the deposition surface for substantially uniform deposition in the region of the deposition surface.

In another embodiment, a method of charging a high performance flow battery comprising delivering a sufficient supply of electrical energy to the flow battery at a voltage higher than a voltage of the flow battery, providing a uniform high current density across a low resistance positive electrode and a low resistance negative electrode, the high current density passing through a region of a deposition surface of at least one half cell of the flow battery, generating an electrolyte flow through a flow channel of the at least one half cell with a high rate of mixing in a deposition region proximate the deposition surface where the electrolyte has sufficiently high concentration of an active ion species for deposition rates on the deposition surface that sustain the uniform high current density through the deposition surface during the charging, maintaining a mass transfer coefficient of the flow proximate the deposition surface sufficiently large to maintain a sufficient electrolyte concentration proximate the deposition surface for substantially uniform deposition in the region of the deposition surface. The flow may be laminar or turbulent. The high rate of mixing is in the range sufficient to maintain the mass transfer coefficient greater than $77 \times 10^{-4}$ cm/s.

Furthermore, the present invention includes a method of optimizing a high performance redox flow battery comprising engineering a flow rate and a flow channel of the flow battery optimized to ensure one or more of the following parameters are satisfied: uniform mass transfer rate across the deposition surface, at optimal fluid velocity; local current density of less than approximately $\frac{2}{3} \times i_L$, but sufficiently high to prevent mossy deposition (in other words a local current density suitable for providing, a dense, adherent, non-dendritic morphology); and concentration depletion along the flow channel (on the Zn side) to approximately <10% of an inlet concentration.

Experiments confirm (1) a zinc solubility of 0.73 M in 4N NaOH and (2) a limiting current density (at a rotating disk electrode) for this solution of 121 mA/cm$^2$ at a rotation speed of 120 rpm at 40° C.

The super-saturated zinc electrolyte—0.73M Zn$^{++}$ in 4N NaOH—was prepared as follows. Step 1: prepare a stock solution (1M Zn$^{++}$ in 5.5N NaOH) by combining 8.139 g of ZnO (m.w. 81.39 g/mol) with 30 gm of NaOH pellets (m.w. 40 g/mol) and making up to 100 ml with D.I. water under constant stirring. The resulting solution is a 1M Zn$^{++}$+5.5N NaOH. Step 2: dilution of (1M Zn$^{++}$/5.5N NaOH) to a 4N NaOH solution by taking 100 ml of (1M Zn$^{++}$ in 5.5N NaOH) stock solution and making it up to 137.5 ml with D.I. water—the resulting solution is 0.73M Zn$^{++}$ in 4N NaOH. (Note that the reported solubility limit of Zn$^{++}$ in 4N NaOH is 0.37M.) Note that electrolytes with NaOH concentrations in the range of 2-4N are found to provide satisfactory zincate ion concentration in combination with tolerable ferrous ion concentration and tolerable corrosive solution properties, whereas NaOH concentrations above 4N result in rapidly reduced ferrous ion concentrations along with an electrolyte which is more corrosive.

Experiments confirm that 0.73M $Zn^{++}$ in 4N NaOH and 0.4 $Zn^{++}$ in 2.2N NaOH are stable for at least four weeks.

Although the present invention has been particularly described with reference to certain embodiments thereof, it should be readily apparent to those of ordinary skill in the art that changes and modifications in the form and details may be made without departing from the spirit and scope of the invention.

What is claimed is:

1. A method of charging a flow battery, comprising:
   circulating a super-saturated electrolyte over a negative electrode plating zone on a surface of a negative electrode of a negative half cell in the flow battery;
   wherein the super-saturated electrolyte is prepared by combining zinc oxide with sodium hydroxide (NaOH) pellets in a silicate-free and phosphate-free solution;
   wherein the super-saturated electrolyte has a zinc ion concentration greater than the equilibrium saturation concentration of the zinc ion in the super-saturated electrolyte and a hydroxide concentration of between 2 normal (N) and 5 normal (N); and
   wherein a mass transfer coefficient of the super-saturated electrolyte is sufficient to maintain a super-saturated electrolyte concentration of zinc ions in the negative electrode plating zone for a substantially uniform deposition of zinc on the surface at a uniform high current density.

2. The method of claim 1, wherein the super-saturated electrolyte has a zinc solubility of greater than about 0.7M in 4N NaOH.

3. The method of claim 1, wherein the super-saturated electrolyte has a zinc solubility of about 0.73M in 4N NaOH.

4. The method of claim 1, wherein the super-saturated electrolyte is prepared by combining the zinc oxide and the sodium hydroxide pellets in water to form a first solution that comprises a zinc ion concentration greater than 0.7 normal (N) and a hydroxide concentration of greater than 4 normal (N) and mixing the first solution with a second solution to form the super-saturated electrolyte that has a zinc ion concentration of about 0.7 normal (N).

5. The method of claim 1, wherein the super-saturated electrolyte is prepared by combining the zinc oxide and the sodium hydroxide pellets in water to form a first solution that comprises a zinc ion concentration greater than 0.7 normal (N) and a hydroxide concentration of greater than 4 normal (N) and mixing the first solution with a second solution to form the super-saturated electrolyte that has a zinc ion concentration of between 0.4 N about 0.7 N and a hydroxide concentration of between about 2N and about 4N.

6. The method of claim 1, wherein circulating the super-saturated electrolyte over the negative plating zone further comprises delivering the super-saturated electrolyte through a porous structure that has a porosity of between 60% and 98% and has a surface that comprises nickel.

7. The method of claim 1, wherein the uniform high current density is greater than 70 $mA/cm^2$.

8. The method of claim 1, wherein a mass transfer coefficient of the super-saturated electrolyte has a value in the approximate range of $5.3 \times 10^{-4}$ m/s to $12.4 \times 10^{-3}$ m/s.

9. The method of claim 1, wherein the flow battery is a flow battery selected from the group consisting of: a ZnFe flow battery, a ZnHBr flow battery, a ZnBr flow battery, a CeZn flow battery; and a ZnCl flow battery.

10. The method of claim 1, further comprising delivering the super-saturated electrolyte through a flow channel that is configured to provide a high rate of mixing within the negative electrode plating zone.

11. A method of charging a flow battery, comprising:
    providing a uniform high current density across a positive electrode and a negative electrode, the uniform high current density passing through a negative electrode plating zone on a surface of the negative electrode of the flow battery;
    circulating a super-saturated electrolyte through a flow channel of the negative electrode, wherein the flow channel is configured to provide mixing of the super-saturated electrolyte in the negative electrode plating zone on the surface of the negative electrode;
    wherein the super-saturated electrolyte is prepared by combining zinc oxide with sodium hydroxide (NaOH) pellets in a silicate-free and phosphate-free solution;
    wherein the super-saturated electrolyte has a zinc ion concentration greater than the equilibrium saturation concentration of the zinc ion in the super-saturated electrolyte and a hydroxide concentration of between 2 normal (N) and 5 normal (N); and
    wherein a mass transfer coefficient of the super-saturated electrolyte is sufficient to maintain a super-saturated electrolyte concentration of zinc ions in the negative electrode plating zone for a substantially uniform deposition of zinc on the surface at the uniform high current density.

12. The method of claim 11, wherein the super-saturated electrolyte has a zinc solubility of greater than about 0.7M in 4N NaOH.

13. The method of claim 11, wherein the super-saturated electrolyte has a zinc solubility of about 0.73M in 4N NaOH.

14. The method of claim 11, wherein the super-saturated electrolyte is prepared by combining the zinc oxide and the sodium hydroxide pellets in water to form a first solution that comprises a zinc ion concentration greater than 0.7 normal (N) and a hydroxide concentration of greater than 4 normal (N) and mixing the first solution with a second solution to form the super-saturated electrolyte that has a zinc ion concentration of about 0.7 normal (N).

15. The method of claim 11, wherein the super-saturated electrolyte is prepared by combining the zinc oxide and the sodium hydroxide pellets in water to form a first solution that comprises a zinc ion concentration greater than 0.7 normal (N) and a hydroxide concentration of greater than 4 normal (N) and mixing the first solution with a second solution to form the super-saturated electrolyte that has a zinc ion concentration of between 0.4 N about 0.7 N and a hydroxide concentration of between about 2N and about 4N.

16. The method of claim 11, wherein circulating the super-saturated electrolyte over the negative plating zone further comprises delivering the super-saturated electrolyte through a porous structure that has a porosity of between 60% and 98% and has a surface that comprises nickel.

17. The method of claim 11, wherein the uniform high current density is greater than 70 $mA/cm^2$.

18. The method of claim 11, wherein a mass transfer coefficient of the super-saturated electrolyte has a value in the approximate range of $5.3 \times 10^{-4}$ m/s to $12.4 \times 10^{-3}$ m/s.

19. The method of claim 11, wherein the flow battery is a flow battery selected from the group consisting of: a ZnFe flow battery, a ZnHBr flow battery, a ZnBr flow battery, a CeZn flow battery; and a ZnCl flow battery.

20. The method of claim 11, wherein the flow channel is configured to provide a high rate of mixing of the supersaturated electrolyte in the negative electrode plating zone proximate the surface of the negative electrode.

* * * * *